Patented Dec. 3, 1935

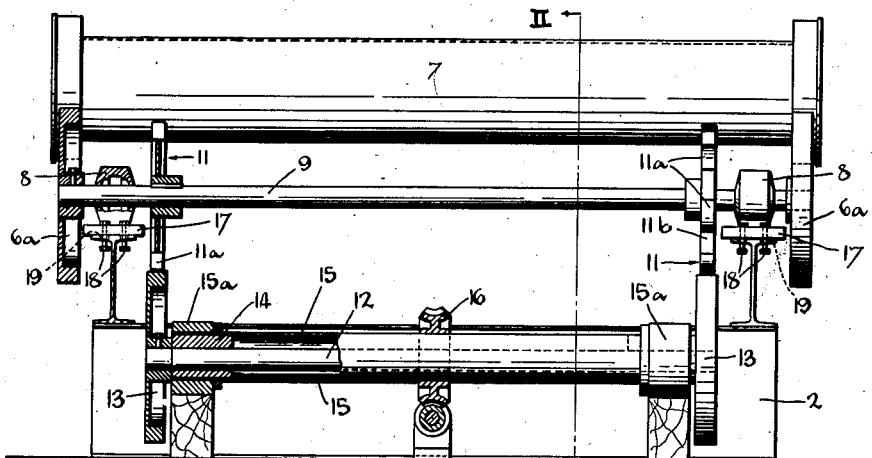
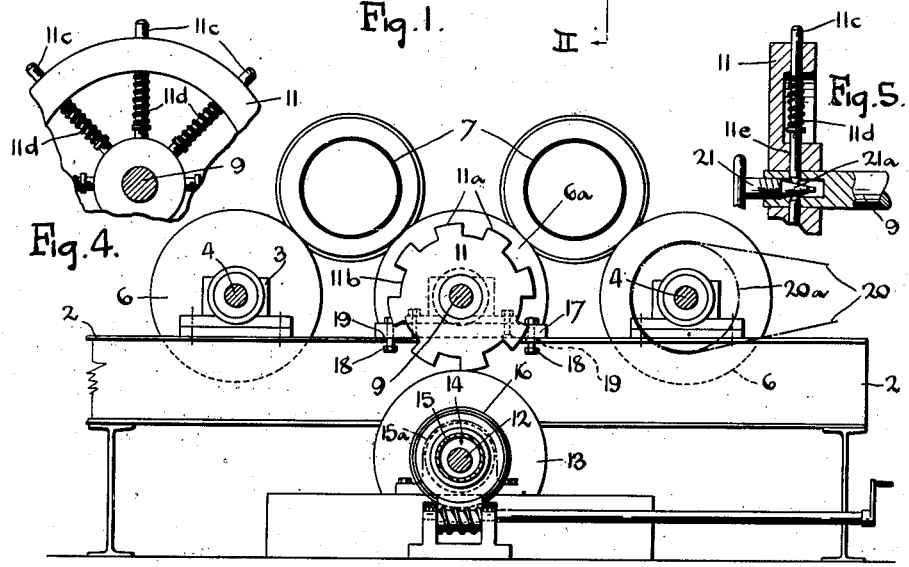
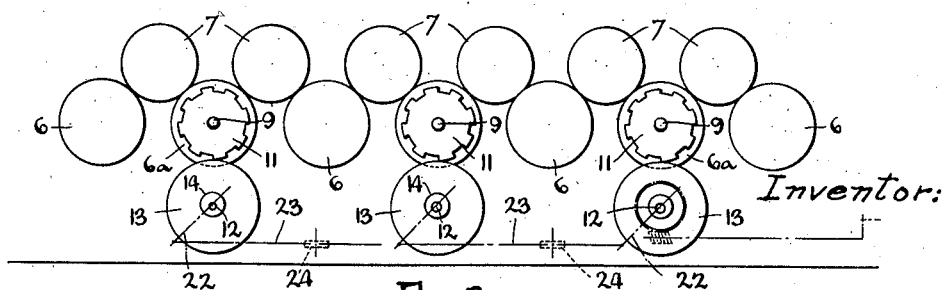

2,023,381

UNITED STATES PATENT OFFICE 2,023,381

CENTRIFUGAL MOLDING OF CONCRETE BODIES

Edward Shotton Hume, Perth, Western Australia, Australia, assignor to Hume Pipe Company (Australia) Limited, Melbourne, Victoria, Australia Application July 10, 1933, Serial No. 679,796
In Australia August 2, 1932

20 Claims. (Cl. 25—30)

This invention relates particularly to the molding, by the centrifugal process, of concrete bodies and particularly concrete pipes and the like. The invention is also applicable to the lining of metal or other pipes with concrete and the terms mold and molding as used in this specification are intended to embrace such lining operations.

In such operations it has hitherto been proposed to subject the pipe or the like to a vibratory action during the centrifugal process with the object of more quickly consolidating the concrete material.

It has also been common practice in the manufacture of concrete bodies to subject the material, without centrifugal action, to a jolting or bumping motion, usually by placing the mold or molds containing the material upon a table which is reciprocated or jolted by means of cams or other devices.

The present invention, which has been evolved as the result of careful study and extensive experiment, provides a new or improved process and apparatus involving the combined action of centrifugal force and a pronounced jolting or concussion whereby distinct and important advantages in the manufacture of concrete products are derived as hereinafter described.

One of the chief advantages resulting from the invention is that much less water than hitherto may be used in the cement mixture thereby ensuring greater strength and solidity in the product. It has been found that an excess of water in the concrete mixture has a weakening effect on the concrete and by using a semi-dry or non-liquid mixture having a minimum water content a much stronger molded article may be produced. Under the centrifugal process as hitherto practised, however, it has not been possible to successfully mold concrete pipes and the like with such a semi-dry mixture owing to the lack of fluidity or mobility which prevents it from flowing or spreading uniformly around and along the mold. Consequently it has been necessary to employ, for molding purposes, a greater proportion of water than is desirable to produce the best results in the product.

The improved results produced in accordance with the present invention are most pronounced in the manufacture of concrete pipes with a very lean or low cement content or on the other hand where practically neat cement is used in conjunction with stone and without sand to form a very dense and strong concrete. The invention is also particularly applicable where it is desired to form a roughened concrete surface on the interior of the pipe to act as an effective key or anchorage for the purpose of effectively binding or bonding a bituminous or like lining material thereto.

It is to be understood that the concussional or jolting action of the present invention is quite distinct from and produces results entirely different from the aforesaid vibratory action during the centrifugal process of molding concrete pipes and the like as previously practiced. Such vibration does not cause the mold containing the concrete to change its position or to be displaced from its supports to any appreciable extent. The slight vibrant or tremulous movement thus imparted to the mold serves merely to assist to some extent in the consolidation of the relatively wet concrete which has usually been employed, hitherto, but is quite ineffective for the purpose of distributing or disseminating the water and causing uniform settlement of the particles of material in the semi-dry concrete mixture as hereinafter described.

On the other hand according to the jolting or concussional action of the present invention the mold is intermittently and abruptly projected upwardly from its normal position of rotation and returns forcibly thereto so that the axis of the rotating mold is continually changing its position. Thus, whilst the material is maintained around the interior of the mold by the centrifugal force, the abrupt jerking or jolting of the mold brings about a physical change in the concrete mixture, causing the water to permeate throughout the mass and effect settlement thereof whereby the material is converted into a pasty or plastic condition throughout with a minimum of water in the mixture. When the concrete has been thus acted upon for a sufficient period the jolting or concussional action may be discontinued and the molding operation completed by rotating or spinning the mold at a higher speed in the usual manner.

The improved results brought about by the concussional or jolting movement as compared with the previously known vibration of the mold during the centrifugal process as above described may, it is thought, be explained by the theory that owing to the surface tension of the globules or particles of water in the concrete mixture such slight vibrant or tremulous movement imparted to the mold is insufficient to break up or diffuse the particles of moisture throughout the material, whereas the abrupt jolting or concussional action overcomes the surface tension of the liquid and causes the particles thereof to break up or become distorted and diffused, so that the particles of cement and aggregate are individually enclosed by films of liquid, thereby converting the original semi-dry mixture into a pasty homogeneous mass of concrete with a minimum water content which ensures an extremely hard and strong product when set.

In addition to the foregoing the invention embodies a process according to which the mold containing the concrete is first centrifugally spun without jolting in the usual manner whilst the material is distributed or spread within the mold which is then subjected to the aforesaid combined centrifugal and concussional action to bring about the desired diffusion of the water and consolidation of the concrete and the mold is finally spun at a higher speed without concussion to finish off the molding operation.

In carrying out the invention a suitable mold is preferably first rotated in the usual manner upon friction wheels or like supporting members whilst the concrete mixture is fed into the mold. This concrete is preferably of a semi-dry nature as above indicated, that is to say, the cement mixture has a water content considerably lower than that usually employed in the manufacture of concrete articles by the centrifugal process, for example, highly satisfactory results in accordance with the invention may be obtained with a concrete mixture comprising—

Aggregate (broken stone and sand) _____ 6½ parts by weight
Portland cement_____ 1 part by weight
Water, of the total mixture by weight_____ 8½%

It will be understood, of course, that the particular proportion of water in the concrete mixture may vary somewhat according to circumstances such as the particular nature and proportions of the other ingredients which may vary considerably, for instance, as previously indicated, in some cases the concrete may have a very lean or low cement content whilst in other mixtures practically neat cement may be used with crushed stone to the exclusion of sand.

When the rotating mold has been thus charged and the semi-dry material distributed around the interior thereof with the aid of a screeding bar or the like, the mold is subjected, whilst still rotating at relatively low speed, to the aforesaid jolting or concussional action which causes the concrete to settle and the moisture thereof to permeate through the mass, thereby rendering the material sufficiently plastic to ensure effective consolidation. When the material has been thus acted upon for a sufficient period the jolting motion may be discontinued and the molding operation completed by spinning the mold at higher speed in the usual manner.

By suitably regulating the proportions of the ingredients in the concrete and subjecting it to the foregoing process a roughened surface may be formed by the particles of material around the interior of concrete pipes and the like to thereby provide an effective bond or key for a bituminous lining material.

Referring to the drawing which forms part of this specification—

Figure 1 is a part sectional side elevation of a suitable apparatus for carrying out the invention.

Figure 2 is an end view of the apparatus seen in Figure 1, parts being broken away for convenience of illustration.

Figure 3 is a diagrammatic view of an apparatus similar to that shown in Figures 1 and 2 but adapted for the simultaneous operation of a larger number of molds.

Figure 4 is a fragmentary side view illustrating a modified type of jolting wheel.

Figure 5 is a vertical section of the modification seen in Figure 4.

Various forms of apparatus may be employed for the purpose of subjecting the mold or molds to the combined centrifugal and concussional action in accordance with this invention. According to one suitable practical embodiment, such apparatus may comprise a framework 2 carrying fixed bearings 3 to support the shafts 4 of the usual plain or smooth faced runner wheels 6 whereby the molds 7 are supported and driven by frictional contact. The said framework may also carry vertically movable bearings 8 for an intermediate shaft 9 carrying additional runner wheels 6a which are arranged between and adapted to co-operate with the first named runner wheels for the purpose of supporting and driving the molds.

Also mounted upon the said intermediate shaft are jolting wheels 11 which are preferably formed with a series of peripheral segmental projections 11a separated by gaps 11b whereby the desired jolting or concussional motion may be transmitted to the mold or molds as hereinafter described.

Mounted upon the framework 2 beneath the aforesaid intermediate shaft 9 is a lower or idle shaft 12 carrying frictional wheels 13 which are adapted to contact with the jolting wheels 11 whereby the desired jolting motion may be imparted to the latter and to the molds as hereinafter described. The shaft 12 is mounted in eccentric bearings 14 which may be fixed within tubular housings or sleeves 15 adapted to be turned within supports 15a by worm gear 16 or other suitable means whereby the shaft 12 and the friction wheels 13 thereon may be raised and lowered to move these wheels into or out of engagement with the jolting wheels 11.

The aforesaid vertically movable bearings of the intermediate shaft 9, which carries the jolting wheels, may be mounted upon vertically movable bed plates 17 carrying vertical bolts 18 which are adapted to slide freely within holes 19 in the machine framework during the jolting or concussional operation of the mold.

The machine may be driven through the medium of a driving belt 20 and pulley 20a on one of the runner wheel shafts, the rotary motion being frictionally transmitted through the various runner wheels and molds. Any suitable change speed gear may be employed for varying the rotational speed of the molds at will.

In operation the molds are placed upon the runner wheels, the lower shaft 12 and the friction wheels 13 thereon being in lowered position so that the wheels 13 are out of contact with the jolting wheels 11. The concrete is now fed into the molds whilst the latter are spun in the usual manner by rotation of the runner wheels at relatively low speed. Owing to the semi-dry or non-liquid state of the concrete it is distributed around the interior of the rotating molds with the aid of a screeding bar or the like. In order to effect the combined centrifugal and concussional action, the bearings 14 of the lower driving shaft are operated to raise the friction wheels 13 thereon into contact with the jolting wheels 11 so that by intermittent contact of the segments or projections thereof with the wheels 13 the intermediate shaft 9 is caused to reciprocate or rise and fall abruptly with its vertically movable bearings thereby transmitting the desired forcible jolting motion to the molds resting upon the runner wheels. When the concussional action has been continued for a sufficient period the shaft 12 is again lowered to disengage the wheels 13 from the jolting wheels 11 whereupon the molds may be again spun without the concussional action, and preferably at a higher speed, to complete the molding operation.

As seen in Figure 3 additional molds 7 may be simultaneously subjected to the combined centrifugal and jolting action by employing additional runner wheels 6, 6a and a series of the shafts 9 mounted in vertically movable bearings and each carrying a pair of the jolting wheels 11 in conjunction with complementary driving wheels 13 on adjustable shafts 12 as previously described. The eccentric bearings 14 of the various shafts 12 may be interconnected by means of levers 22 on the respective sleeves 15 carrying said bearings, and coupling rods 23 extending between said levers whereby the various shafts 12 may be raised and lowered to bring the driving wheels 13 into and out of engagement with the jolting wheels. The rods 23 may be provided with turnbuckles 24 for adjustment of length.

According to a modification as illustrated in Figures 4 and 5 the jolting wheels 11 may be constructed with radial pins 11c adapted to project from the periphery of the respective wheels. These pins may be fitted with springs 11d adapted to force the pins inwardly within the radial passages 11e and by means, for instance, of an adjusting screw 21 having a tapered or conical portion 21a accommodated in an axial passage of the wheel shaft 9 and engaging the inner ends of the pins 11c, the latter may be radially adjusted to project more or less from the periphery of the wheel and thus regulate the degree of the jolting movement to which the molds are submitted.

The jolting wheels with adjustable pins as above-mentioned, may be used to engage the frictional driving wheels 13 and transmit the jolting motion to the runner wheels 6a and the molds as described in connection with the arrangement seen in Figures 1 to 3 or, alternatively the jolting wheels, either of the segmental projection type seen in Figures 4 and 5 or of the radial pin type, may be employed to directly support and jolt the rotating molds by resting the latter upon the jolting wheels and transmitting the drive directly to the shaft on which the jolting wheels are mounted. The arrangement shown in Figures 1 to 3 is, however, preferred.

Having now described my invention what I claim as new and desire to secure by Letters Patent is—

1. In a process of centrifugally molding concrete bodies, the steps of rotating a mold containing a concrete mixture about a horizontal axis to arrange the mixture in the mold by centrifugal force and simultaneously intermittently and abruptly projecting the mold upwardly from its normal position of horizontal rotation and returning it forcibly thereto to subject the mixture to a pronounced jolting and concussional action transversely of the axis of rotation.

2. In a process of centrifugally molding concrete bodies, the steps of rotating a mold containing a concrete mixture about a horizontal axis to arrange the mixture in the mold by centrifugal force, simultaneously intermittently and abruptly projecting the mold upwardly from its normal position of horizontal rotation and returning it forcibly thereto to subject the mixture to a pronounced jolting and concussional action transversely of the axis of rotation, and subsequently rotating the mold about a fixed horizontal axis at a high rate.

3. In a process of centrifugally molding concrete bodies, the steps of rotating a mold containing a concrete mixture in a semi-dry or non-liquid state about a horizontal axis to arrange the mixture in the mold by centrifugal force and simultaneously intermittently and abruptly projecting the mold upwardly from its normal position of rotation and returning it forcibly thereto to subject the mixture to a pronounced jolting and concussional action effective in the same plane in which centrifugal action resulting from rotation of the mold takes place, whereby the water in said mixture is forced through the concrete mass to convert the same into a more pasty and plastic condition.

4. In a process of centrifugally molding concrete bodies, the steps of rotating a mold containing a concrete mixture in a semi-dry or non-liquid state about a horizontal axis to arrange the mixture in the mold by centrifugal force, then intermittently and abruptly projecting the mold upwardly from its normal position of rotation and returning it forcibly thereto to subject the mixture to a pronounced jolting and concussional action transversely of the axis of rotation, while continuing to rotate the mold, and subsequently rotating the mold about a fixed horizontal axis at a high rate.

5. An apparatus for centrifugally molding concrete bodies, comprising a rotary concrete pipe mold, means for supporting said mold for rotation about a horizontal axis, and means operable during rotation of said mold for simultaneously intermittently and abruptly projecting the mold upwardly from its normal position of rotation so that it returns forcibly thereto to impart a pronounced jolting and concussional motion to the mold.

6. An apparatus for centrifugally molding concrete bodies, comprising a rotary concrete pipe mold, runner wheels for supporting said mold in a horizontal position for rotation about a horizontal axis, and jolting means operable while the mold is rotating for intermittently and abruptly projecting said mold upwardly from its normal position of rotation so that it returns forcibly thereto to impart a pronounced jolting and concussional movement to the mold.

7. An apparatus for centrifugally molding concrete bodies, comprising a pair of shafts, means for horizontally supporting said shafts in parallel spaced relation, runner wheels mounted on each shaft, a rotary concrete pipe mold supported by the runner wheels on said shafts for rotation about a horizontal axis, jolting wheels mounted on at least one of said shafts, and means for engaging said jolting wheels and cooperating therewith for intermittently and abruptly moving the shaft carrying the jolting wheels vertically during rotation of said mold to impart a jolting motion to said mold.

8. An apparatus for centrifugally molding concrete bodies, comprising a pair of shafts, means for horizontally supporting said shafts in parallel spaced relation, runner wheels mounted on each shaft, a rotary concrete pipe mold supported by the runner wheels on said shafts for rotation about a horizontal axis, and means for intermittently and abruptly moving at least one of said shafts vertically during rotation of said mold to impart a jolting motion to the mold.

9. An apparatus for centrifugally molding concrete bodies, comprising a pair of parallel shafts, means for horizontally supporting said shafts in parallel spaced relation, runner wheels mounted on each shaft, a rotary concrete pipe mold supported by the runner wheels on said shafts for rotation about a horizontal axis, jolting wheels mounted on at least one of said shafts, and means for engaging said jolting wheels and cooperating therewith for intermittently and abruptly moving the shaft carrying the jolting wheels vertically during rotation of said mold to impart a jolting motion to said mold, said vertically movable shaft being mounted in bearings adapted to move with the shaft and reciprocate vertically relative to the supporting means.

10. An apparatus for centrifugally molding concrete bodies, comprising a pair of spaced horizontal parallel shafts mounted in fixed bearings, runner wheels mounted on said shafts, an intermediate horizontal shaft disposed between and parallel to said shafts and supported for free vertical movement, runner wheels mounted on said intermediate shaft, a rotary concrete pipe mold supported on the wheels carried by one fixed shaft and those on the intermediate shaft, a second mold supported on the wheels carried by the other fixed shaft and those on said intermediate shaft, and means associated with said intermediate shaft for intermittently and abruptly moving said intermediate shaft vertically during rotation of the molds to impart jolting motion thereto.

11. An apparatus for centrifugally molding concrete bodies, comprising a pair of spaced horizontal parallel shafts mounted in fixed bearings, runner wheels mounted on said shafts, an intermediate horizontal shaft disposed between and parallel to said shafts and supported for free vertical movement, runner wheels mounted on said intermediate shaft, a rotary concrete pipe mold supported on the wheels carried by one fixed shaft and those on the intermediate shaft, a second mold supported on the wheels carried by the other fixed shaft and those on said intermediate shaft, jolting wheels provided with spaced peripheral projections mounted on said intermediate shaft, and means for engaging said projections during rotation of the intermediate shaft and molds for imparting jolting motion thereto.

12. An apparatus for centrifugally molding concrete bodies, comprising a supporting frame, a pair of spaced horizontal parallel shafts mounted in bearings fixed on said frame, runner wheels mounted on said shafts, an intermediate horizontal shaft disposed between and parallel to said shafts, runner wheels mounted on said intermediate shaft, bearings for said intermediate shaft, means for mounting said intermediate shaft bearings on said frame for vertical movement relative to said frame, a rotary concrete pipe mold supported on the wheels carried by one fixed shaft and those on the intermediate shaft, a second mold supported on the wheels carried by the other fixed shaft and those on said intermediate shaft, and means associated with said intermediate shaft for intermittently and abruptly moving said intermediate shaft vertically during rotation of the molds to impart jolting motion thereto.

13. An apparatus for centrifugally molding concrete bodies, comprising a concrete pipe mold, means for supporting and rotating said mold to impart centrifugal force to a concrete mixture therein, means for simultaneously intermittently and abruptly projecting the rotating mold upwardly from its normal position of rotation so that it returns forcibly thereto during rotation to impart a pronounced jolting or concussional motion to said mold, and a device for controlling said jolting means whereby the jolting means may be operated to impart jolting motion to the mold and whereby the mold may be rotated free of jolting motion.

14. An apparatus for centrifugally molding concrete bodies, comprising a concrete pipe mold, means for rotatably supporting said mold including jolting wheels, idling wheels adapted to engage with said jolting wheels and cooperate therewith to simultaneously intermittently and abruptly project the mold while rotating upwardly from its normal position of rotation so that it returns forcibly thereto, and means for moving the idling wheels into and out of engagement with said jolting wheels to respectively render the jolting wheels effective and ineffective.

15. An apparatus for centrifugally molding concrete bodies, comprising a concrete pipe mold, a pair of spaced parallel horizontal shafts, means for rigidly supporting one shaft, means for floatingly supporting the other shaft for vertical movement, means on said shafts for rotatably supporting said mold, jolting wheels having spaced peripheral projections mounted on the floating shaft, a shaft beneath said floating shaft, idling wheels mounted thereon adapted to engage the jolting wheels to impart jolting motion to the floating shaft and the mold, and means for vertically adjusting the position of the shaft carrying the idling wheels to control the jolting of the mold.

16. An apparatus for centrifugally molding concrete bodies, comprising a concrete pipe mold, a pair of spaced parallel horizontal shafts, means for rigidly supporting one shaft, means for floatingly supporting the other shaft for vertical movement, means on said shafts for rotatably supporting said mold, jolting wheels having spaced peripheral projections mounted on the floating shaft, a shaft beneath said floating shaft, idling wheels mounted thereon adapted to engage the jolting wheels to impart jolting motion to the floating shaft and the mold, eccentric bearings supporting the idling wheel shaft, and means for rotating said eccentric bearings to vertically adjust the position of the idling wheel shaft to move the idling wheels into and out of engagement with said jolting wheels.

17. An apparatus for centrifugally molding concrete bodies, comprising a rotary concrete pipe mold, runner wheels for supporting said mold in a horizontal position for rotation about a horizontal axis, and jolting means operable while the mold is rotating for intermittently and abruptly projecting said mold upwardly from its normal postiton of rotation so that it returns forcibly thereto to impart a pronounced jolting and concussional movement to the mold, said jolting means comprising jolting wheels having radially adjustable pins projecting from the periphery thereof and idling wheels cooperating with the jolting wheels.

18. An apparatus for centrifugally molding concrete bodies, comprising a rotary concrete pipe mold, runner wheels for supporting said mold in a horizontal position for rotation about a horizontal axis, and jolting means operable while the mold is rotating for intermittently and abruptly projecting said mold upwardly from its normal position of rotation so that it returns forcibly thereto to impart a pronounced jolting and concussional movement to the mold, said jolting means comprising jolting wheels having radially adjustable pins projecting from the periphery thereof, idling wheels cooperating with the jolting wheels, and means for radially moving said pins in unison to positions of adjustment.

19. An apparatus for centrifugally molding concrete bodies, comprising a rotary concrete pipe mold, runner wheels for supporting said mold in a horizontal position for rotation about a horizontal axis, and jolting means operable while the mold is rotating for intermittently and abruptly projecting said mold upwardly from its normal position of rotation so that it returns forcibly thereto to impart a pronounced jolting and concussional movement to the mold, said jolting means comprising jolting wheels having radially adjustable pins projecting from the periphery thereof, idling wheels cooperating with the jolting wheels, and springs associated with said adjustable pins.

20. An apparatus for centrifugally molding concrete bodies, comprising a rotary concrete pipe mold, runner wheels for supporting said mold in a horizontal position for rotation about a horizontal axis, and jolting means operable while the mold is rotating for intermittently and abruptly projecting said mold upwardly from its normal position of rotation so that it returns forcibly thereto to impart a pronounced jolting and concussional movement to the mold, said jolting means comprising jolting wheels having radially adjustable pins projecting from the periphery thereof, idling wheels cooperating with the jolting wheels, springs urging said pins to a retracted position, a conical cam engaging with the inner ends of said pins, and means for moving the conical cam axially of the jolting wheels to move said pins against the action of said springs.

E. S. HUME.